United States Patent
Fourre et al.

(10) Patent No.: US 10,691,915 B2
(45) Date of Patent: Jun. 23, 2020

(54) DEVICE FOR CAPTURING AN IMPRINT OF A BODY PART

(71) Applicants: IDEMIA IDENTITY & SECURITY FRANCE, Issy les Moulineaux (FR); COMMISSARIAT A L'ENERGIE ATOMIQUE ET AUX ENERGIES ALTERNATIVES, Paris (FR)

(72) Inventors: Joël-Yann Fourre, Issy les Moulineaux (FR); Jean-François Mainguet, Grenoble (FR)

(73) Assignees: IDEMIA IDENTITY & SECURITY FRANCE, Issy les Moulineaux (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 113 days.

(21) Appl. No.: 15/949,558

(22) Filed: Apr. 10, 2018

(65) Prior Publication Data
US 2018/0300525 A1 Oct. 18, 2018

(30) Foreign Application Priority Data

Apr. 12, 2017 (FR) ..................................... 17 53179

(51) Int. Cl.
*G06K 9/00* (2006.01)

(52) U.S. Cl.
CPC ......... *G06K 9/0004* (2013.01); *G06K 9/0012* (2013.01); *G06K 9/00093* (2013.01)

(58) Field of Classification Search
CPC .................. G06K 2209/00; G06K 9/00; G06K 2009/0006; G06K 9/00375; G06K 9/00382; G06K 19/07354; G06K 19/0718

(Continued)

(56) References Cited

U.S. PATENT DOCUMENTS

| 3,200,701 A | 8/1965 | White |
| 10,216,975 B1 * | 2/2019 | He ...................... G06K 9/2018 |

(Continued)

FOREIGN PATENT DOCUMENTS

| CN | 106203408 A * | 12/2016 | ......... G06K 9/00053 |
| FR | 2757974 A1 | 7/1998 | |
| WO | 2016/205832 A1 | 12/2016 | |

OTHER PUBLICATIONS

Jan. 24, 2018 Search Report issued in French Patent Application No. 1753179.

(Continued)

*Primary Examiner* — Dwayne D Bost
*Assistant Examiner* — Stephen M Brinich
(74) *Attorney, Agent, or Firm* — Oliff PLC; R. Brian Drozd

(57) ABSTRACT

A compact device for capturing an imprint of a body part working by total reflection with dark background. The device includes a plurality of optically coupled elements including: a first transparent plate including a top face on which the body part bearing the imprint to be imaged can rest; a light source; a screen opaque to light situated below the first transparent plate including a network of holes; a second transparent plate situated below the opaque screen; and a sensor capable of generating an imprint image situated below the second transparent plate; each transparent plate having a refractive index greater than a refractive index of air, and the light source being able to be positioned at the level of the screen to directly illuminate the top face or below the screen to illuminate the top face through the holes.

16 Claims, 8 Drawing Sheets

(58) Field of Classification Search
USPC ........................ 382/124–127, 100, 312, 318;
340/5.52–5.32, 5.82–5.83; 396/14–15;
D14/383–384
See application file for complete search history.

(56) References Cited

U.S. PATENT DOCUMENTS

| | | |
|---|---|---|
| 2004/0252867 A1* | 12/2004 | Lan ..................... G06K 9/0004 382/124 |
| 2010/0118131 A1* | 5/2010 | Lee .................... G06K 9/00013 348/77 |
| 2017/0017824 A1 | 1/2017 | Smith et al. |
| 2017/0161541 A1* | 6/2017 | Li ........................ G06K 9/0004 |
| 2017/0221960 A1 | 8/2017 | Lin et al. |

OTHER PUBLICATIONS

Wikipedia Contributers; "Coded aperture;" Wikipedia, the Free Encyclopedia; retreived from https://en.wikipedia.org/wiki/Coded_aperture on Apr. 10, 2018.
Levin et al; "Image and Depth from a Conventional Camera with a Coded Aperture;" ACM Transaction on Graphcs; vol. 26; No. 3; Article 70; Jul. 2007; 9 pp.

* cited by examiner

DEVICE FOR CAPTURING AN IMPRINT OF A BODY PART

The invention relates to a device for capturing an imprint of a body part. It is applicable in the field of fingerprint recognition.

CONTEXT OF THE INVENTION

The use of fingerprints, for example of the type of an imprint of a finger, of a plurality of fingers, of a palm of a hand, allows to secure access to buildings or to machines. Such technology allows to dispense with access codes or cards which can be loaned, stolen or falsified. The use of this technology allows to reinforce the security in as much as the probability that two people have two identical fingerprints is virtually zero.

A device for capturing a fingerprint allows to capture an image of a fingerprint. In the case of an identification, this imprint is compared with a set of reference fingerprints contained in a database. In the case of an authentication, this imprint is compared to a single fingerprint. The comparison allows to determine whether the captured fingerprint belongs or does not belong to a person referenced in the database or whether the person is indeed who he or she claims to be.

FIG. 5 schematically describes a device for capturing a fingerprint working in total reflection mode and that can operate in a bright field or in a dark field.

The device 50 described in FIG. 5 comprises a prism 500, two light sources 501A and 501B, and an optical system 502 such as, for example, a CCD (Charge-Coupled Device) or CMOS (Complementary Metal Oxide Semiconductor) sensor and one or more lenses.

The light source 501A generates a light beam which passes through a first face 500A of the prism 500 to a second face 500C of the prism 500 where the part of the body (here a finger D) bearing the fingerprint is positioned. The imprint is made up of valleys and peaks. The light beam generated by the light source 501A forms an incident angle $\alpha_A$ with the normal to the face 500C. The angle $\alpha_A$ is greater than a critical angle $\theta_c$ and less than a limit angle $\theta_l$.

The face 500C separates a first medium corresponding to the prism 500 from a second medium corresponding to air or to the finger D. The critical angle $\theta_c$ (respectively the limit angle $\theta_l$) is defined as the angle beyond which total reflection occurs when a beam reaches the face 500C when the second medium is air (respectively when the second medium is the finger D).

When the finger D is placed on the face 500C, the light beam generated by the source 501A undergoes a total reflection when, at the position struck by the light beam on the face 500C, the finger forms a valley, i.e. there is air between the face 500C and the finger D. When, at the position struck by the light beam on the face 500C, the finger forms a peak, i.e. the skin of the finger is in direct contact with the face 500C, there is no total reflection. The total reflection is then said to be frustrated and the light beam is diffused in the finger D.

After reflection on the face 500C, the light beam passes through the fourth face 500D and reaches the optical system 502. The optical system 502 then forms an image of the fingerprint with strong contrast between the valleys and the peaks. The valleys correspond to beams totally reflected by the face 500C and therefore appear very light in the image. The peaks correspond to diffused light beams, partly absorbed in the finger D and which reemerged from the finger to reach the optical system 502. The peaks therefore appear darker in the image.

The optical system 502 therefore receives both light beams reflected by the face 500C and diffused in the finger D. The device formed by the source 501A, the prism 500 and the optical system 502 is a device using the principle of total reflection with bright field. A similar device can be found in the American U.S. Pat. No. 3,200,701.

The light source 501B generates a light beam which passes through a third face 500B of the prism 500 to the second face 500C where the finger D is positioned. The light beam generated by the light source 501B forms an incident angle $\alpha_B$ with the normal to the face 500C less than the critical angle $\theta_c$ (here, the incident angle $\alpha_B$ is zero degree). The light beam generated by the source 501B is not therefore totally reflected by the face 500B.

The optical system 502 receives the light beam generated by the source 501B after diffusion by the finger D. The optical system 502 is configured so as to receive light beams after diffusion in the finger D forming an angle lying between the critical angle $\theta_c$ and the limit angle $\theta_l$ with the normal to the face 500C. The optical system 502 therefore receives only light beams resulting from a diffusion in the finger D but no light beam resulting from a reflection on the top face 500C. Here again, the optical system 502 forms an image of the fingerprint with strong contrast between the valleys and the peaks. The peaks correspond to diffused light beams, partly absorbed in the finger D and which reemerged from the finger at the level of the peaks in contact with the face 500B to reach the optical system 502. No light beam diffused in the finger D and reemerging from the finger D at the level of the valleys can reach the optical system 502 because they cannot pass through the layer of air and then be propagated in the prism 500 while forming an angle relative to the normal to the face 500B greater than the critical angle $\theta_c$. The peaks therefore appear much lighter in the imprint image than the valleys. The device formed by the source 501B, the prism 500 and the optical system 502 is a device using the principle of total reflection with dark field. A similar device can be found in the French patent FR2757974.

The critical angle $\theta_c$ is given by the following formula:

$$\theta_c = \arcsin\left(\frac{n_0}{n_1}\right)$$

$n_1$ being the refractive index of the prism and $n_0$ being the refractive index of air or of the finger. For a refractive index of air equal to "1" and a refractive index of the prism equal to "1.5", a critical angle $\theta_c$=41.8 degrees is obtained. The refractive index of the skin, in the visible range, lies between "1.41" and "1.47". By considering the minimum value of "1.41", a limit angle $\theta_l$ of "70" degrees is therefore obtained. By considering the maximum value, an angle $\theta_l^{max}$ of "76" degrees is obtained.

The devices for capturing a biometric imprint working by total reflection with bright field have the known drawback of being sensitive to the defects that the face on which the finger rests (here the face 500C) could include: scratches, dirt, etc. Indeed, these defects locally modify the reflection properties of the face 500C (which is then no longer a total reflection) by creating a little absorption or diffusion.

A device for capturing a fingerprint described in the patent application US20170017824 is known that is compatible with portable equipment items because it is more compact.

FIG. 6 schematically describes such a compact device for capturing a fingerprint. This device 6 comprises a first transparent plate 60 comprising a face 600 on which the part of the body (here the finger D) bearing the fingerprint can rest. Below the transparent plate 60 there is a light source 61 formed by a thin layer of organic LEDs (Organic Light-Emitting Diodes (OLED)). Hereinafter we will use the term LED to denote, without preference, light-emitting diodes and organic light-emitting diodes. Below the light source 61 there is a collimation layer 62 in the form of a more or less opaque plate comprising holes (pinholes) generally of circular form evenly distributed over the plate. Two holes 65A and 65B passing through the thin layer of LEDs 61 and the collimation layer 62 are represented. The collimation layer 62 is followed by a second transparent plate 63, of a thickness less than the thickness of the glass plate 60. Below the transparent plate 63 there is a sensor 64 sensitive to the light emitted by the light source 61 such as a CCD or CMOS sensor. In the device described in relation to FIG. 6, the form of the holes (i.e. height, diameter) is of crucial importance. Indeed, in this device, only the light beams that have an incidence angle on the face 600 close to "0 degree" relative to the normal to the face 600 (such as the beam 66B) can pass through the collimation layer. Light beams having a greater incidence angle (such as the beam 66A) must be blocked by the collimation layer 62. Indeed, it is essential in this device that the images formed facing each hole be separate on the sensor 64 otherwise the zones of overlap would appear fuzzy. However, by preventing the light beams that have a great incidence angle from reaching the sensor 64, it becomes impossible to exploit total reflection, in particular the light beams after diffusion in the finger D forming an angle lying between the critical angle $\theta_c$ and the limit angle $\theta_l$ with the normal to the face 600, which prevents an image with strong contrast between the valleys and the peaks of a fingerprint from being obtained.

It is desirable to mitigate these drawbacks in the prior art. It is in particular desirable to propose a device for capturing a fingerprint which is both compact and which operates by total reflection. It is desirable for this device to be almost or completely insensitive to any defects of the surface on which the body part to be imaged rests.

SUMMARY OF THE INVENTION

According to a first aspect of the invention, the invention relates to a device for capturing an imprint of a body part comprising a plurality of optically coupled elements comprising:
  a first transparent plate comprising a top face on which the body part bearing the imprint to be imaged can rest;
  a light source;
  a screen opaque to light situated below the first transparent plate;
  a second transparent plate situated below the opaque screen;
  a sensor comprising light-sensitive photoreceptors situated below the second transparent plate supplying information allowing to generate an image of the imprint;
  the faces of the transparent plates, the opaque screen and the sensor being parallel.

The light source generates light beams passing through at least the first transparent plate toward the top face having an incident angle relative to a normal to said top face of a value less than a critical angle dependent on the refractive indices of the first plate and of air and beyond which a light ray is totally reflected by said top face in the presence of air above said top face. The opaque screen comprises a network of holes such that each light ray directed towards the sensor which reaches the opaque screen at a hole passes through the opaque screen and reaches the sensor. Each light-sensitive photoreceptor of the sensor (124) is positioned outside of each position of the sensor (124) that can be struck by a light ray from the body part having an incidence angle relative to said normal less than the critical angle, each point of the body part in contact with the top face is imaged by at least one photoreceptor of said sensor.

The device is therefore a device for capturing an imprint of a body part operating by total reflection with dark field. This device can be compact and, the fact that it works on dark field allows to reduce the impact of any defects of the top face.

According to one embodiment, the transparent plates have a refractive index greater than a predefined minimum index greater than the refractive index of air.

According to one embodiment, at least some of the holes, called imaging holes, serve to image the body part, and a distance between an imaging hole and the imaging hole or holes which are its closest neighbours, taken from centre to centre, is greater than the diameter of an image of the body part seen by a hole when the body part is placed on the top face.

According to one embodiment, the light source is composed of at least one light-emitting diode, called LED, and when the light source comprises a plurality of LEDs, the LEDs are configured such that each LED producing light and the LED or LEDs producing light which are the closest neighbours of said LED generate, on the body part, parts illuminated directly by said LEDs that are distant by a distance less than a predefined distance characteristic of a depth of penetration of the light into the body part.

According to one embodiment, the light source is incorporated on a bottom face of the first plate or incorporated on a top face of the second plate and generates a light beam above the opaque screen.

According to one embodiment, the light source is incorporated on the surface of the sensor or incorporated in the sensor and generates a light beam below the opaque screen passing through the opaque screen via holes towards the top face and each LED of the light source is positioned facing a hole of the opaque screen, at least some of the holes being associated with a LED.

According to one embodiment, the LEDs are grouped in sets of LEDs, each set of LEDs being intended to be switched on independently of the other sets of LEDs, at least one of the sets of LEDs being switched on to acquire an intermediate image, each intermediate image acquired being used to form the image of the print.

According to one embodiment, each photoreceptor used to form an image is situated outside of a predefined vicinity of each LED switched on Thus, by distancing the photoreceptors used to form an intermediate image from the LEDs that are switched on, any disturbance of these photoreceptors by said LEDs that are switched on is avoided.

According to one embodiment, the holes of the opaque screen form a rectangular matrix of holes or a hexagonal meshing of holes.

According to one embodiment, the holes of the opaque screen form a rectangular matrix of holes, one hole out of two per row of the rectangular matrix of holes and one hole out of two per column of the rectangular matrix of holes are associated with a LED where the holes of the opaque screen form a first and a second interleaved rectangular matrices of holes, the holes of the first rectangular matrix of holes are associated with a LED and the holes of the second rectangular matrix of holes are not associated with a LED, each hole associated with a LED of the first matrix of holes being positioned at an equal distance from the centre of the four holes of the second matrix of holes in its closest vicinity.

According to one embodiment, the holes which are associated with a LED have a diameter greater than the holes which are not associated with a LED.

According to one embodiment, the holes of the opaque screen form a rectangular matrix of holes, each hole being associated with a LED, the device is adapted for one LED out of two for each row and one LED out of two for each column of the matrix of LEDs to be switched on to allow a capture of a first intermediate image and only the LEDs not switched on for the first intermediate image are switched on to capture a second intermediate image, an imprint image being formed from the first and the second intermediate images.

According to one embodiment, each light-emitting diode generates a light beam directed towards the holes having a maximum incidence angle relative to a normal to the opaque screen that allows to avoid, after reflection on the opaque screen, having these light-emitting diodes illuminate light-sensitive photoreceptors.

According to one embodiment, when a point of the body part is imaged by several photoreceptors of the sensor, the information items from each sensor having imaged said point are mutually rebalanced by taking into account, for each photoreceptor, an information item representative of a distance between said photoreceptor and the point which has been imaged, a representation of this point in an imprint image is computed following the rebalancing in the form of an average of the information items from each photoreceptor having imaged this point or in the form of a weighted average of the information items from each photoreceptor having imaged this point or in the form of a median value of the information items from each photoreceptor having imaged this point or in the form of a minimum value of the information items from each photoreceptor having imaged this point.

According to one embodiment, each photoreceptor of the sensor corresponding to a position that can be struck by a light ray from the body part having an incidence angle relative to the normal to the top face less than the critical angle is masked by an opaque metallic layer.

There is thus an assurance that the photoreceptors located under the metallic layer do not capture any light and that, consequently, they do not disturb the neighbouring photoreceptors.

According to one embodiment, convergent lenses are placed in the holes of the opaque screen, said convergent lenses having a focal distance at most equal to a distance between the lens and the sensor.

According to one embodiment, a filter is added at the level of the holes to filter the light rays having wavelengths that do not correspond to the wavelengths generated by the light source.

According to one embodiment, the first plate has a thickness three to ten times greater than a thickness of the second plate.

According to one embodiment, when the light source is incorporated on the bottom face of the first plate, each light-emitting diode comprises, in a first layer, a first transparent electrode, in a second layer situated immediately below the first, a stack of layers forming an LED and in a third layer common to each LED of the light source, a metal layer forming a second electrode, each layer being produced by deposition and etching on the bottom face of the first plate, the opaque screen being implemented by said metal layer and comprising holes.

According to one embodiment, the third layer also comprises a non-conducting and absorbent layer situated below the layer of metal forming the second electrode.

According to one embodiment, the holes are circular or in the form of a ring.

According to a second aspect of the invention, the invention relates to an equipment item comprising a device according to the first aspect.

According to a third aspect of the invention, the invention relates to a method for detecting fraud in the use of a device for capturing an imprint of a body part according to the first aspect. The method comprises:

determining if the sensor is struck by light rays having an incident angle relative to the normal to the top face greater than a maximum value that can be taken by a limit angle dependent on the refractive indices of the first plate and of the body part and beyond which a light ray is totally reflected by said top face when said light ray strikes the top face at a point of contact between the top face and a finger or, if, in at least one predetermined zone of the sensor, the sensor is struck exclusively by light rays having an incident angle relative to the normal to the top face less than a minimum value that can be taken by the limit angle; and, detecting that there is a fraud if the sensor is struck by light rays having an incident angle relative to the normal to the top face greater than said maximum value or, if in at least one predetermined zone of the sensor, the sensor is struck exclusively by light rays having an incident angle relative to the normal to the top face less than said minimum value.

According to a fourth aspect of the invention, the invention relates to a computer program comprising instructions for implementing, by a device, the method according to the third aspect, when said program is run by a computation unit of said device.

According to a fifth aspect of the invention, the invention relates to storage means, storing a computer program comprising instructions for implementing, by a device, the method according to the third aspect, when said program is run by a computation unit of said device.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF VARIOUS EMBODIMENTS

The following description details more particularly embodiments of the present invention in a smartphone context. The invention can be applied to other equipment items that can comprise a device for capturing an imprint of a body part such as a computer, a tablet, etc. Moreover, the invention is described in a context in which the body part is a finger. It does however apply to other body parts such as several fingers, a palm of a hand, etc.

Figure 1:
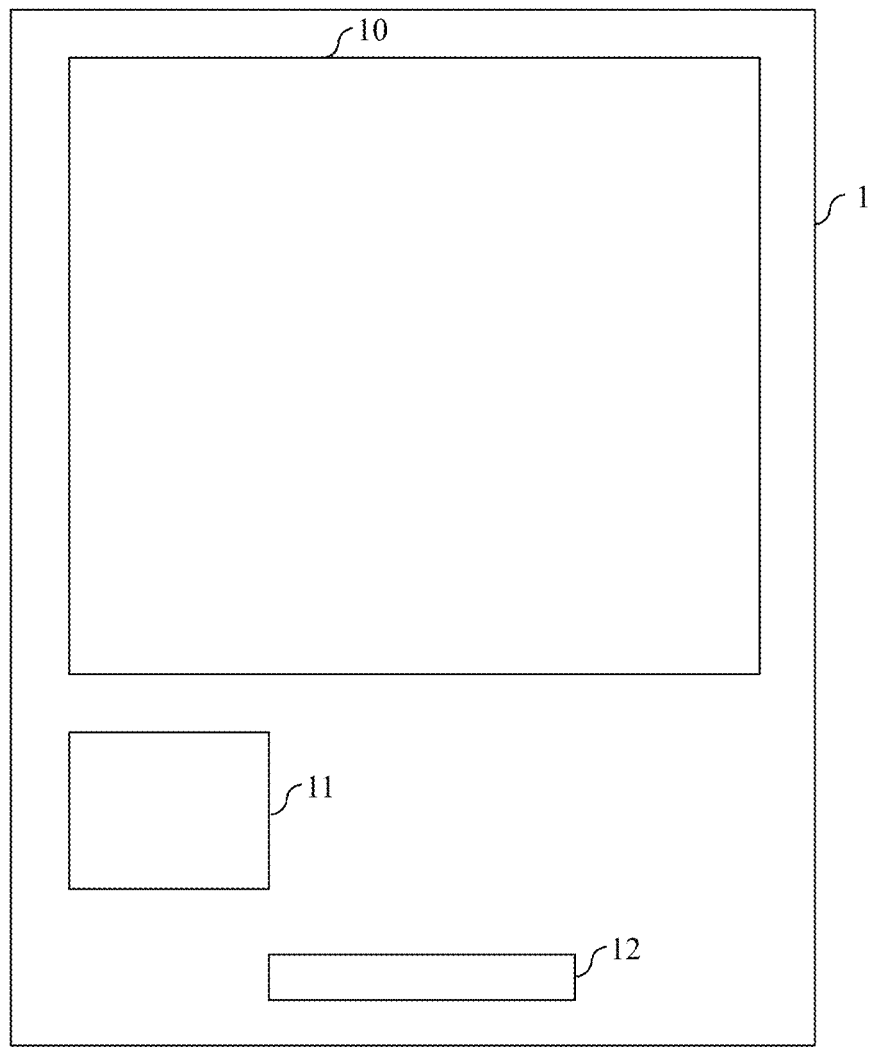
FIG. 1 schematically illustrates an equipment item comprising a device for capturing an imprint of a body part according to the invention.

FIG. 1 schematically illustrates an equipment item comprising a device for capturing an imprint of a body part according to the invention.

Here, the equipment item 1 is a smartphone comprising a screen 10, a processing module 11 and a device for capturing an imprint of a body part 12. The device for capturing an imprint of a body part will hereinafter be called biometric device. The processing module 11, that is described hereinbelow in relation to FIG. 9, can implement several functionalities of the equipment item 1 comprising in particular processing of data from the biometric device 12. The biometric device 12 is for example used by an owner of the equipment item 1 to be authenticated with the equipment item 1 and thus be able to use it.

In a particular implementation, the device for capturing an imprint of a body part 12 is incorporated in the screen 10.

Figure 2:
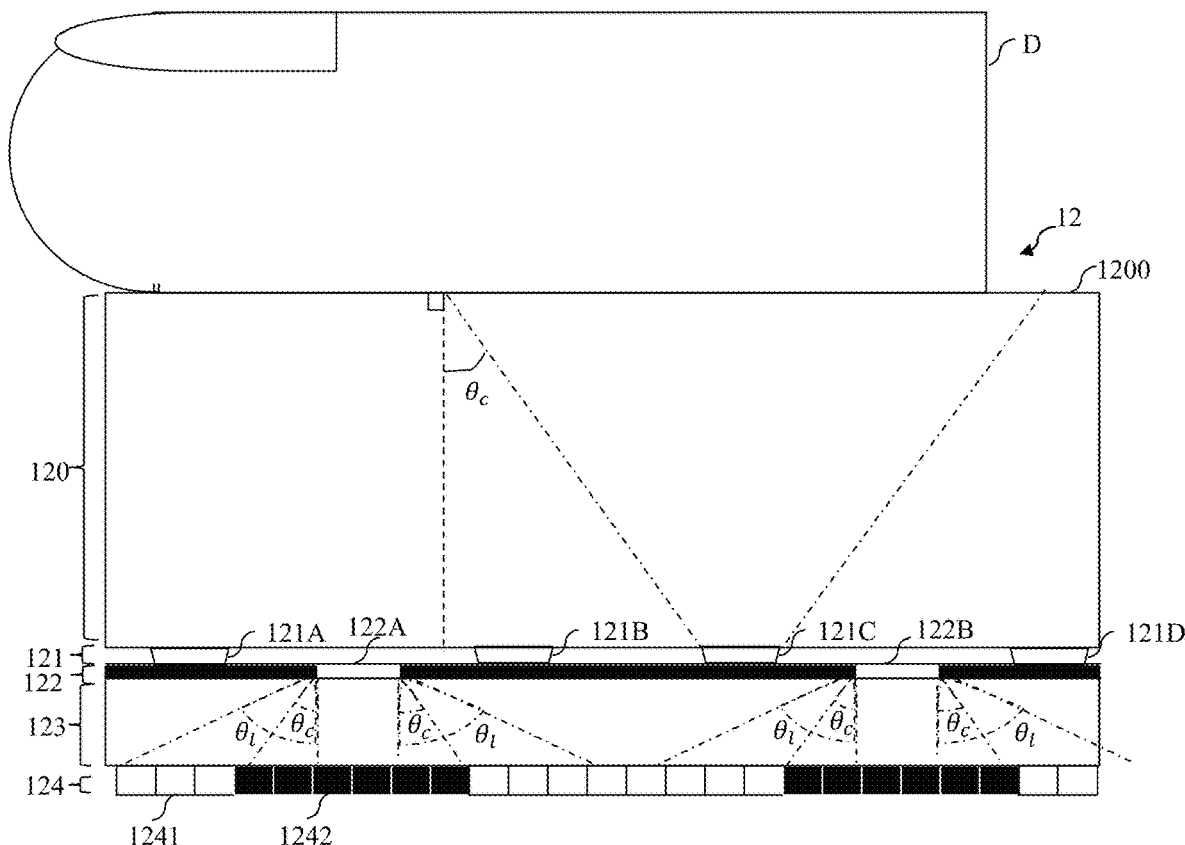
FIG. 2 schematically illustrates a first embodiment of a device for capturing an imprint of a body part according to the invention.

FIG. 2 schematically illustrates a first embodiment of the biometric device 12 according to the invention.

The biometric device 12 comprises a plurality of optically coupled elements comprising:

- a first transparent plate 120 of thickness $E_{120}$ comprising a top face 1200 on which the body part (here the finger D) bearing the fingerprint to be imaged can rest;
- a light source 121 adapted to illuminate the finger D here composed of LEDs. Four LEDs 121A, 121B, 121C and 121D are represented in FIG. 2;
- a screen opaque to light 122 situated below the first transparent plate 120;
- a second transparent plate 123 of thickness $E_{123}$ situated below the opaque screen 122;
- a sensor 124 comprising light-sensitive photoreceptors situated below the second transparent plate 123.

The transparent plates 120 and 123 have a refractive index greater than a predefined minimum refractive index $n_{min}$ greater than the refractive index of air.

In one embodiment, this minimum refractive index is greater than "1.3".

In another embodiment, this minimum refractive index is greater than the refractive index of the finger D, more particularly greater than 1.47. It is in fact known that when the refractive index of at least the second plate 123 is greater than the refractive index of the finger, the image of the finger is of finite extent.

In one embodiment, the two transparent plates 120 and 123 have a different refractive index.

Hereinafter in the explanation, to simplify, it will be assumed that the two transparent plates 120 and 123 have a refractive index that is identical and for example equal to "1.5". Optically coupled should be understood to mean that a ray going from the top face of the first plate to the bottom face of the second plate does not pass through any medium of index less than $n_{min}$. This can be done in the case of two glass plates for example by gluing the two plates with a glue of adequate refractive index.

The faces of the transparent plates 120 and 123, the opaque screen 122 and the sensor 124 are parallel. Here, the opaque screen 122 and the sensor 124 are considered to be plates of thickness less than the thickness of the two transparent plates 120 and 123.

The light source 121 generates light beams passing through the top plate 120 having an incident angle relative to the normal to the top face 1200 of a maximum value less than the critical angle $\theta_c$.

Each LED of the light source 121 generates a light beam above the opaque screen 122 towards the top face 1200. Each LED is configured such that each light ray emanating from this LED has an incident angle relative to the normal to the top face 1200 of a maximum value less than the critical angle $\theta_c$. In this way, no light ray emanating from a LED of the light source 121 undergoes total reflection on the top face 1200. With such a configuration of the light source 121, all the surface of the finger D facing the face 1200 may not be illuminated. However, since a finger is a volume-diffusing medium, all of the finger D facing the top face 1200 will return light if the distance between two illuminated parts is less than a predefined distance $d_p$ characteristic of a depth of penetration of the light into the finger D varying from approximately one millimetre for blue light to several centimetres for infrared light. Therefore, in order for all of the finger D facing the top face 1200 to be illuminated, the LEDs of the light source are therefore configured such that each LED and the LED or LEDs which are the closest neighbours of said LED generate, on the finger D, parts illuminated directly by the LEDs distant by a distance $\delta$ less than the distance $d_p$, the distance $\delta$ being the minimum distance between two boundaries of illuminated parts. The sensor 124 therefore receives light beams from a diffusion by the finger D of the light rays produced by the light source 121. This type of light source allows to obtain a device for capturing a fingerprint working by total reflection with dark field. One advantage of the devices for capturing a fingerprint that work by total reflection with dark field is that they are less sensitive to the defects of the top face 1200.

Figure 6:
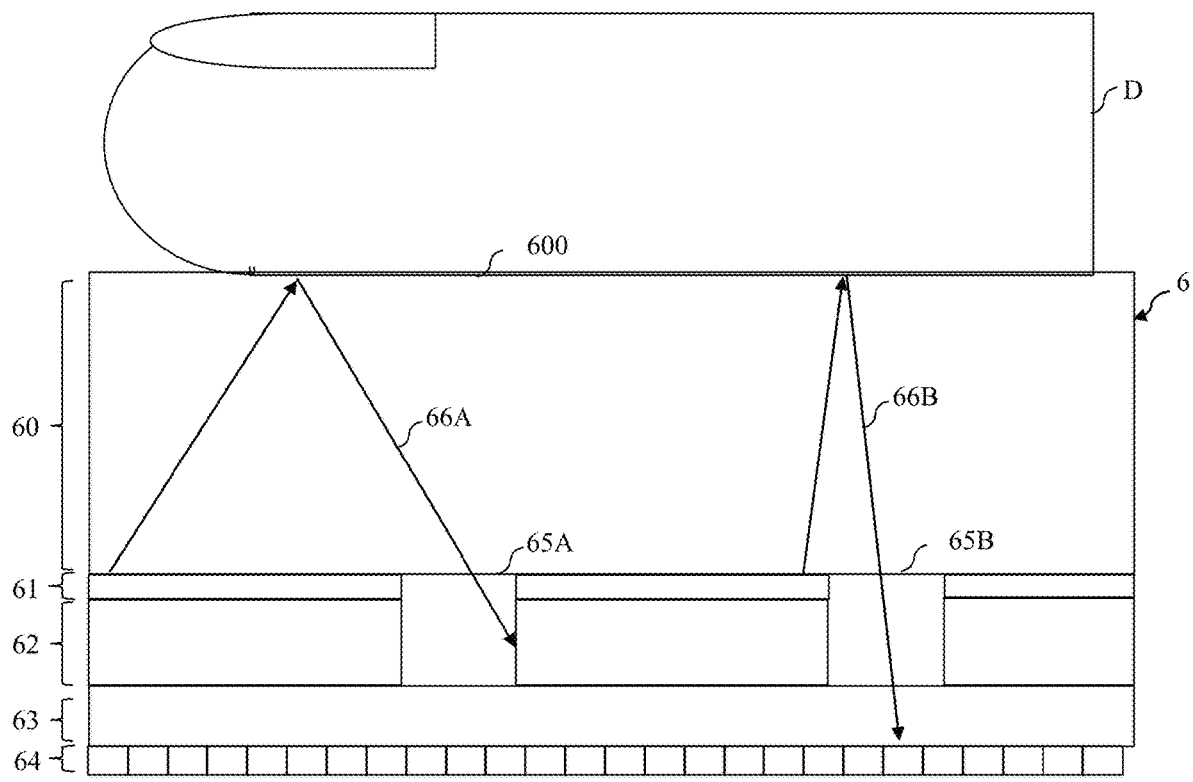
FIG. 6 schematically illustrates a compact device for capturing an imprint of a body part of the prior art.

The opaque screen 122 is a thin layer which can be produced for example by printing or by deposition of an opaque coating on the plate 123. The opaque screen 122 is not however totally opaque since it is composed of a network of holes. Each light ray directed towards the sensor 124 which reaches the opaque screen 122 at a hole passes through the opaque screen 122 and reaches the sensor 124. Unlike the collimation layer of FIG. 6, each hole therefore allows a light ray coming from the finger D directed towards the sensor 124 at the entrance of said hole, to reach the sensor 124.

In a particular implementation, the opaque screen 122 is a thin layer which can be produced by printing or by deposition of an absorbent coating on the top face of the transparent plate 123 or on the bottom face of the transparent plate 120 such as a metallic deposition. Each hole of the opaque screen 122 is filled with a material having a refractive index greater than the predefined minimum refractive index $n_{min}$.

The sensor 124 is for example a CCD sensor or a CMOS sensor composed of a matrix of photoreceptors (such as the photoreceptor 1241) sensitive to the wavelength of the light beams emitted by the light source 121. The sensor is optically coupled to the plate 123. The sensor 124 receives light passing through the holes of the opaque screen 122 and generates information items from the received light which are used by the processing module 11 to produce an imprint image. The imprint image thus produced is composed of a matrix of pixels, each pixel being derived from of one or more photoreceptors. To obtain a good contrast between the peaks and the valleys of the fingerprints, only the light rays from the finger D that have an incidence angle relative to the normal to the top face 1200 lying between the critical angle $\theta_c$ and the limit angle $\theta_l$ must be considered. The light rays from the finger D after diffusion in the finger D have any incidence angle. Light rays from the finger D and having incidence angles less than the critical angle $\theta_c$ could therefore reach the sensor 124 if they succeed in crossing one of the holes of the opaque screen 122.

In order to prevent the taking into account of the light rays that have an incidence angle less than the critical angle $\theta_c$ in the imprint images generated by the processing module 11, the sensor 124 does not have light-sensitive photoreceptors at each position of the sensor that can be struck by a light ray from the finger D having an incidence angle relative to the normal to the top face 1200 less than the critical angle $\theta_c$. Each light-sensitive photoreceptor of the sensor (124) is therefore positioned outside of each position of the sensor (124) that can be struck by a light ray from the finger D having an incidence angle relative to the normal to the top face 1200 less than the critical angle $\theta_c$. In other words, each photoreceptor is placed outside of a set of the zones corresponding to a union of the projections of the holes on the sensor (124) in all the directions exhibiting an angle relative to said normal less than the critical angle $\theta_c$. In this way, only information items originating from the photoreceptors situated in positions that can be struck by light rays from the finger D after diffusion in the finger D having an incidence angle relative to the normal to the top face 1200 lying between the critical angle $\theta_c$ and the limit angle $\theta_l$ are used by the processing module 11 to form imprint images.

In a particular implementation, the sensor 124 does not have photoreceptors at each position that can be struck by a light ray from the finger D after diffusion in the finger D having an incidence angle relative to the normal to the top face 1200 less than the critical angle $\theta_c$. The processing module 11 cannot therefore receive information items corresponding to light rays from the finger D after diffusion in the finger D having an incidence angle relative to the normal to the top face 1200 less than the critical angle $\theta_c$.

In a particular implementation, the processing module 11 does not consider any information item originating from a photoreceptor situated at a position that can be struck by a light ray from the finger D after diffusion in the finger D having an incidence angle relative to the normal to the top face 1200 less than the critical angle $\theta_c$ to generate an imprint image. The processing module 11 therefore uses exclusively information items from photoreceptors struck by light rays from the finger D after diffusion in the finger D having an incidence angle relative to the normal to the top face 1200 between the critical angle $\theta_c$ and the limit angle $\theta_l$. The photoreceptors generating information items which are not considered by the processing module 11 are therefore rendered insensitive to light a posteriori through software processing.

In a particular implementation, each photoreceptor of the sensor 124 corresponding to a position that can be struck by a light ray from the finger D after diffusion in the finger D having an incidence angle relative to the normal to the top face 1200 less than the critical angle $\theta_c$ is masked by an opaque metallic layer, for example of aluminium. The photoreceptors situated below the opaque metallic layer therefore become insensitive to the light and cannot therefore supply information items corresponding to light rays from the finger D after diffusion in the finger D having an incidence angle relative to the normal to the top face 1200 less than the critical angle $\theta_c$ to the processing module 11. It is known that a photoreceptor of a CCD or CMOS sensor struck by a light beam risks disturbing the photoreceptors in its vicinity, in particular when these photoreceptors are strongly saturated (for example when the sensor 124 is directed towards the sun). One advantage of this particular implementation relative to the preceding two particular implementations is that, the masking of the photoreceptors being able to be struck by a light ray from the finger D after diffusion in the finger D having an incidence angle relative to the normal to the top face 1200 less than the critical angle $\theta_c$ prevents these photoreceptors from disturbing their neighbours.

To avoid having the incidence zones overlap, the holes of the opaque screen 122 are arranged such that the distance L between a hole and the hole or holes which are its closest neighbours, taken centre-to-centre, is greater than the diameter of a projection of the finger D on the sensor 124 seen by a hole when the finger D is placed on the top face 1200. If $d_T$ is the diameter of the hole, the diameter of the projection of the finger D on the sensor 124 seen by a hole $d_{AP}$ is given by:

$$d_{AP}=d_T+2\cdot E_{123}\cdot\tan(\theta_l)$$

and therefore:

$$L>d_{AP}$$

Note that, in a general case where the refractive indices of the plate 120 and of the plate 123 are different, the diameter $d_{AP}$ is given by:

$$d_{AP}=d_T+2\cdot|y|\cdot E_{120}\cdot\tan(\theta_l)$$

in which y represents an enlargement of the device 12:

$$\gamma = \frac{-E_{123} \times n_{120}}{E_{120} \times n_{123}}$$

in which $n_{120}$ is the refractive index of the plate 120 and $n_{123}$ is the refractive index of the plate 123.

In a particular implementation, the holes of the opaque screen 122 are spaced apart from one another by a distance $L > d_{AP}$ and, provided that the constraint on the distance L is observed, placed anywhere on the opaque screen 122.

In a particular implementation, the holes of the opaque screen 122 are spaced apart from one another by a distance $L > d_{AP}$ and placed regularly, for example in the form of a rectangular matrix or of a hexagonal meshing, on the opaque screen 122.

In FIG. 2, the photoreceptors of the sensor 124 represented in white (such as the photoreceptor 1241) are light-sensitive photoreceptors. The photoreceptors of the sensor 124 represented in black (such as the photoreceptor 1242) are light-insensitive photoreceptors.

Figure 3:
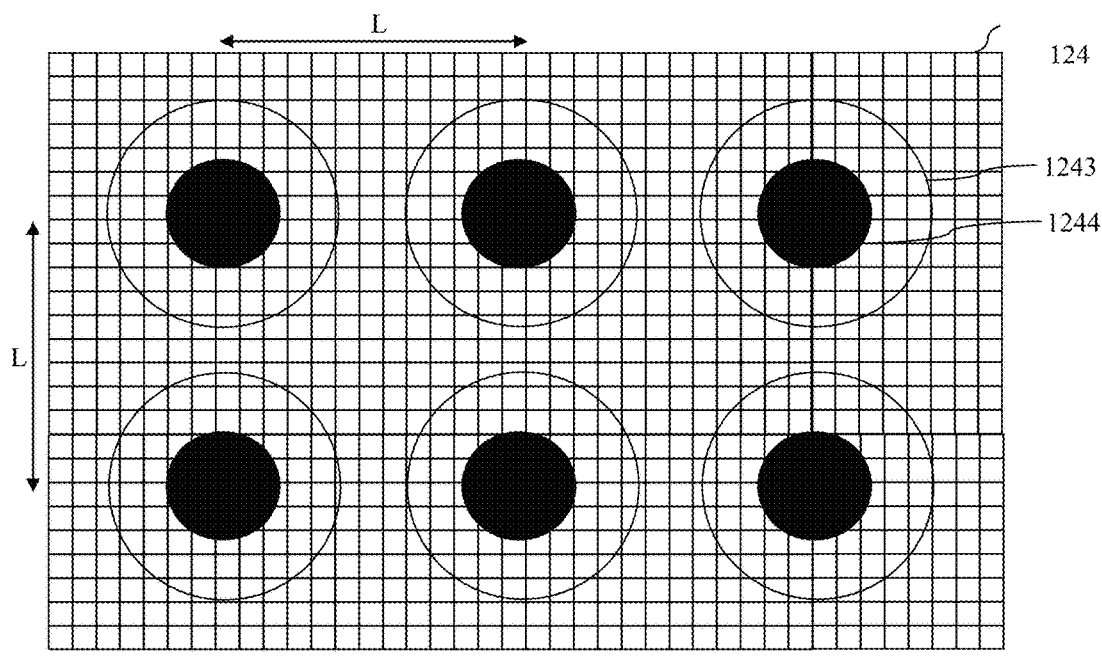
FIG. 3 schematically illustrates a subpart seen from the front of a light-sensitive sensor adapted for the first embodiment of the device for capturing an imprint of a body part.

FIG. 3 schematically illustrates a subpart seen from the front of the sensor 124 adapted for the first embodiment of the biometric device 12.

The case assumed here is that in which the holes of the opaque screen 122 are spaced apart from one another by a distance $L > d_{AP}$ and placed regularly in the form of a rectangular matrix of holes.

The sensor 124 is composed of a matrix of square photoreceptors generally of from "1" to "10"μ m side.

Superposed on the sensor 124, a series of incidence zones evenly distributed on the sensor 124 is represented. Each incidence zone comprises a central disc such as the disc 1244 and a peripheral ring such as the ring 1243, the central disc and the peripheral ring of an incidence zone being concentric. Each incidence zone corresponds to one of the holes of the opaque screen 122 and represents a projection of the finger D on the sensor 124 seen by a hole when the finger D is placed on the top face 1200. For example, the incidence zone comprising the central disc 1244 and the peripheral ring 1243 corresponds to the hole 122A. The outer diameter of each peripheral ring therefore corresponds to the diameter $d_{AP}$ of a projection of the finger D on the sensor 124 seen by a hole when the finger D is placed on the top face 1200. Since the holes of the opaque screen 122 take the form of a rectangular matrix of holes, the incidence zones follow this form on the sensor 124. When the holes of the opaque screen 122 are circular, the centre of the incidence zone corresponding to a hole and the centre of said hole coincide. The part situated in a peripheral ring (for example the peripheral ring 1243) corresponds to a zone receiving light rays that have passed through the opaque screen 122 through a hole (here the hole 122A) and having an incident angle with the normal to the top face 1200 lying between the critical angle $\theta_c$ and the limit angle $\theta_l$. The part situated inside the central disc (for example the central disc 1244) corresponds to a zone receiving light rays that have passed through the opaque screen 122 through a hole (here the hole 122A) and that have an incident angle with the normal to the top face 1200 less than the critical angle $\theta_c$. Each part of the sensor 124 situated inside a central disc therefore corresponds to a part for which the recovery of information is not desired. The photoreceptors situated in each of these parts must therefore be insensitive to the light. Each part of the sensor 124 situated in a peripheral ring therefore corresponds to a part for which the recovery of information is desired. The photoreceptors situated in each of these parts must therefore be sensitive to the light. The photoreceptors situated outside of a peripheral ring receive little, even never receive, light originating from the finger if the refractive index of the finger placed on the top face 1200 is less than the refractive index of the transparent plates 120 and 123.

Note that each point of the finger D placed on the top face 1200 is imaged at least once on the sensor 124. Since the biometric device 12 has a known geometry, it is possible to determine which photoreceptor of the sensor 124 images a point of the finger D. It then becomes possible to reconstruct an image of the imprint of the finger D by known techniques.

In a particular implementation, the distance L between each hole allows to image each point of the finger D facing the top face 1200 at least twice.

In a particular implementation, when one and the same point of the finger D is imaged by several photoreceptors of the sensor 124, the processing module 11 takes account of the information from each photoreceptor that has imaged this point to generate a representation of this point in the image of the imprint. During this generation of a representation, the processing module 11 mutually rebalances the information items from each photoreceptor by taking into account, for each photoreceptor, an information item representative of a distance between said photoreceptor and the point which has been imaged.

In a particular implementation, when one and the same point of the finger D is imaged by several photoreceptors of the sensor 124, following the rebalancing, the processing module 11 computes an average of the information items from each photoreceptor that has imaged this point to generate a representation of this point in an imprint image.

In a particular implementation, when one and the same point of the finger D is imaged by several photoreceptors of the sensor 124, following the rebalancing, the processing module 11 computes a weighted average of the information items from each photoreceptor having imaged this point to generate a representation of this point in an imprint image, the weighting depending on a distance between the point on the finger and the photoreceptor having imaged this point or on an incidence angle of a light ray from this point on said photoreceptor.

In a particular implementation, when one and the same point of the finger D is imaged by several photoreceptors of the sensor 124, following the rebalancing, the processing module computes a median value of the information items from each photoreceptor having imaged this point to generate a representation of this point in an imprint image.

In a particular implementation, when one and the same point of the finger D is imaged by several photoreceptors of the sensor 124, following the rebalancing, the processing module uses the information item of minimum value out of the information items from each photoreceptor having imaged this point to generate a representation of this point in an imprint image. This particular implementation allows to reduce the impact of any defects of the top face 1200 which would be revealed by light external to the biometric device 12 such as the light of the sun. Note that this particular implementation can be used to detect certain types of frauds consisting in applying a glancing light on the top face 1200 to try to exploit traces left by a finger on the top face 1200. Indeed, because of the angle of the glancing light, some points which ought to be imaged by several photoreceptors will be imaged only by a subset of these photoreceptors. If photoreceptors that have to image a point give values for this point very far from the values given by other photoreceptors imaging this point, it is possible to conclude that a fraud attempt is in progress.

In a particular implementation, the transparent plates 120 and 123 are square glass plates of "4.4" mm side and, as seen above, of refractive index $n_1=1.5$. The sensor 124 is of square form of "3.9" mm side comprising square photoreceptors of "4" µm side.

In a particular implementation, the transparent plate 123 has a thickness $E_{123}$ three to ten times less than the thickness $E_{120}$ of the transparent plate 120. For example, the thickness $E_{123}=60$ µm and the thickness $E_{120}=300$ µm allow, when the two plates have the same refractive index, to obtain an enlargement of −⅕ (i.e. an image of an object on the sensor 124 is five times smaller than the real object placed on the top face 1200 and, conversely, a zone of the sensor 124 corresponds to a zone five times larger on the top face 1200). In this particular implementation, the transparent plate 123 is glued onto the sensor 124 or produced by a series of depositions on the sensor 124.

In another implementation, the thickness $E_{123}=150$ µm and the thickness $E_{120}=750$ µm, producing the same enlargement of −⅕.

The fingerprint imaging standards recommend finger image resolutions greater than 500 or 1000 dots per inch (dpi). With an enlargement of −⅕, if the aim is to obtain a finger image sampled at more than 500 dpi (respectively 1000 dpi), pixels of less than 10 µm (respectively less than 5 µm) are necessary.

In a particular implementation, the holes of the opaque screen 122 have a diameter of "7" µm and form a regular matrix of 10×10 holes in which the holes are spaced apart by a distance L=400 µm from centre to centre from one another, as represented in FIG. 3. With a critical angle $\theta_c=41.8$ degrees, a limit angle $\theta_l=70$ degrees, a hole diameter of "7" µm and a thickness of the plate 123 of "60" µm, each central disc has a diameter of approximately "114" µm and each peripheral ring has an outer diameter of approximately "337" µm.

In a particular implementation, the bottom face of the opaque screen 122 and the edges of the holes are made absorbent by applying known techniques (application of a layer of black chrome, of a layer of ink, texturing of the bottom face, etc.) in order to minimize reflections between the opaque screen 122 and the sensor 124. In a particular implementation, the holes of the opaque screen 122 are not circular, but have the form of a ring or a more complex form. This allows, with the principle of coded aperture (described in the web page https://en.wikipedia.org/wiki/Coded_aperture), to increase the surface of the hole while enhancing the accuracy of the image obtained after software processing (deconvolution). That allows to simultaneously improve a signal-to-noise ratio and an accuracy of the imprint image.

In a particular implementation, the holes of the opaque screen 122 are coded holes as defined in the document "Image and Depth from a Conventional Camera with a Coded Aperture; A. Levin, R. Fergus, F. Durand, W. T. Freeman, ACM Tr. On Graphics, Vol. 26, No. 3, Article 70, July 2007".

In a particular implementation, the LEDs, which are represented in FIG. 2 outside of the plates 120 and 123 for greater clarity, are either incorporated on a bottom face of the plate 120 (i.e. on the face of the plate 120 which is in contact with the opaque screen 122), or incorporated on the top face of the plate 123 (i.e. the face of the plate 123 comprising the opaque screen 122).

Figure 7A:
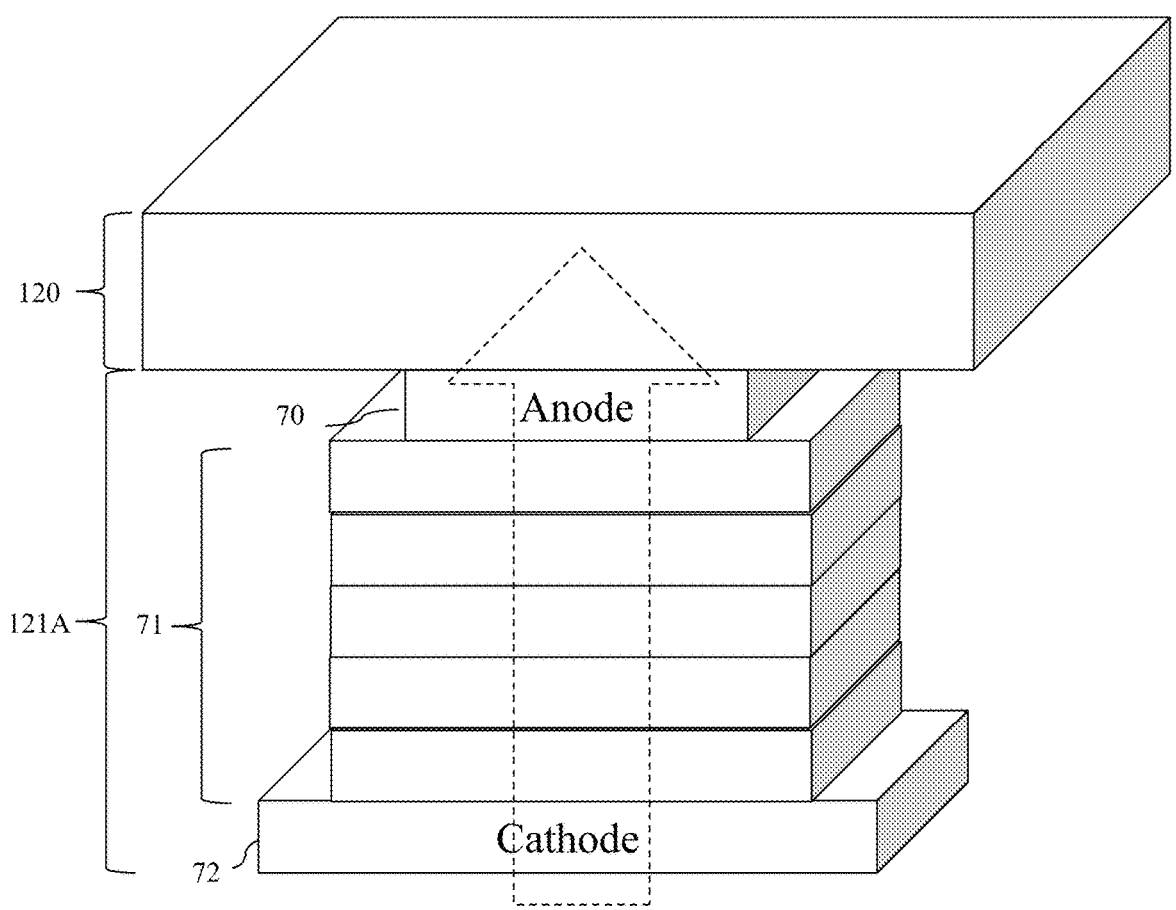
FIGS. 7A and 7B describe in detail a particular implementation of the first embodiment of the device for capturing an imprint of a body part in which a light source is incorporated on a bottom face of a first plate on which a body part can rest.
Figure 7B:
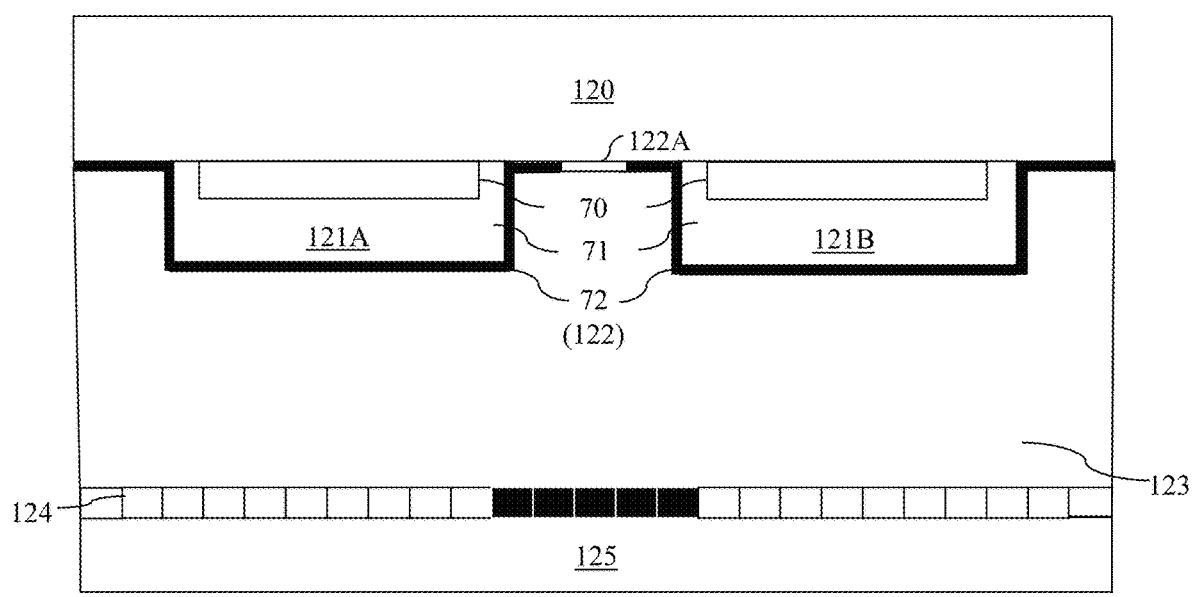

FIGS. 7A and 7B describe in detail a particular implementation of the first embodiment in which the LEDs are incorporated on the bottom face of the plate 120.

FIG. 7A describes, in detail, a LED suited to the first embodiment.

In the case of FIG. 7A, the LED is an OLED. The example of the LED 121A is taken here.

The LED 121A comprises, in a first layer, a first transparent electrode 70 produced for example by deposition and etching on the bottom face of the plate 120 of an alloy of tin-doped indium oxide (Indium Tin Oxide (ITO)).

In a second layer situated immediately below the first, the LED 121A comprises a stack of layers to form the OLED 71 produced for example by deposition and etching or by printing. The layers forming the OLED 71 are almost transparent. Note that the second layer can comprise another type of LED.

In a third layer situated immediately below the second, the LED 121A comprises a second electrode 72. The electrode 72 comprises a layer of metal which serves as reflecting mirror to recover the light which is directed downwards (i.e. towards the sensor 124) and thus increase the upward light efficiency. Furthermore, that prevents glare to the sensor 124. In one embodiment, the second electrode 72 comprises a second layer situated below the layer of metal, the second layer being non-conducting and absorbent. It is shown hereinbelow in relation to FIG. 7B that the second electrode 72 serves also as opaque screen 122.

As the dotted line arrow shows, the light produced by the LED 121A is directed upwards, that is to say towards the transparent plate 120.

The different layers that make up the LED 121A have a thickness of the order of a micrometre.

FIG. 7B details an example of assembly of the plate 120, of the light source 121, of the opaque screen 122, of the plate 123 and of the sensor 124 in the biometric device 12.

Only a subpart of the biometric device 12 is represented in FIG. 7B.

In FIG. 7B, there is the plate 120 which comprises the LED 121A and the LED 121B, which is identical to the LED 121A. For each LED, there are the first electrode 70, the OLED stack 71 and the second electrode 72. The second electrode 72 is prolonged on the bottom face of the plate 120, but comprises a hole. The second electrode 72 is linked between each LED that makes up the light source 121. The hole represented in the second electrode 72 corresponds to a hole, here the hole 122A, of the opaque screen 122. More generally, the layer of metal forming the second electrode comprises holes situated between the LEDs and the opaque screen 122 is implemented by said layer of metal. In one embodiment, these holes have a diameter of more than "100" µm.

In one embodiment, the plate 123 is glued on its top face to the opaque screen 122 and on its bottom face to the sensor 124.

In one embodiment, the first electrodes are also linked together, which allows to control all the OLEDs together.

In one embodiment, the sensor 124 is produced on a glass plate 125 or on a silicon plate.

In a particular implementation, the LEDs are LEDS in gallium nitride (GaN) or OLEDs.

In a particular implementation, the LEDs could be replaced by a laser beam generation device.

In a particular implementation, each LED generates a light beam with a wavelength greater than "600" nm, for a better penetration into the finger and thus a better diffusion.

In a particular implementation, the wavelength of the light beams emitted by the LED is less than "980" nm in order to be able to use light-sensitive sensors made of silicon.

In a particular implementation, convergent lenses are placed in the holes of the opaque screen 122. These lenses ideally have a focal distance at most equal to the distance between the lens and the sensor (here, this distance is equal to the thickness $E_{123}$). The diameter of the lenses can be greater than the diameter of the holes in order to collect more light. This particular implementation allows to use holes and lenses of a diameter greater than the diameter of the holes used hitherto in the preceding implementations and therefore allows to collect more light.

In a particular implementation, a filter can be added at the level of the holes to filter the light rays having wavelengths that do not correspond to the wavelengths generated by the LEDs. In this way, a risk that the imprint images are corrupted by external light rays to the biometric device 12 is diminished.

Figure 4A:
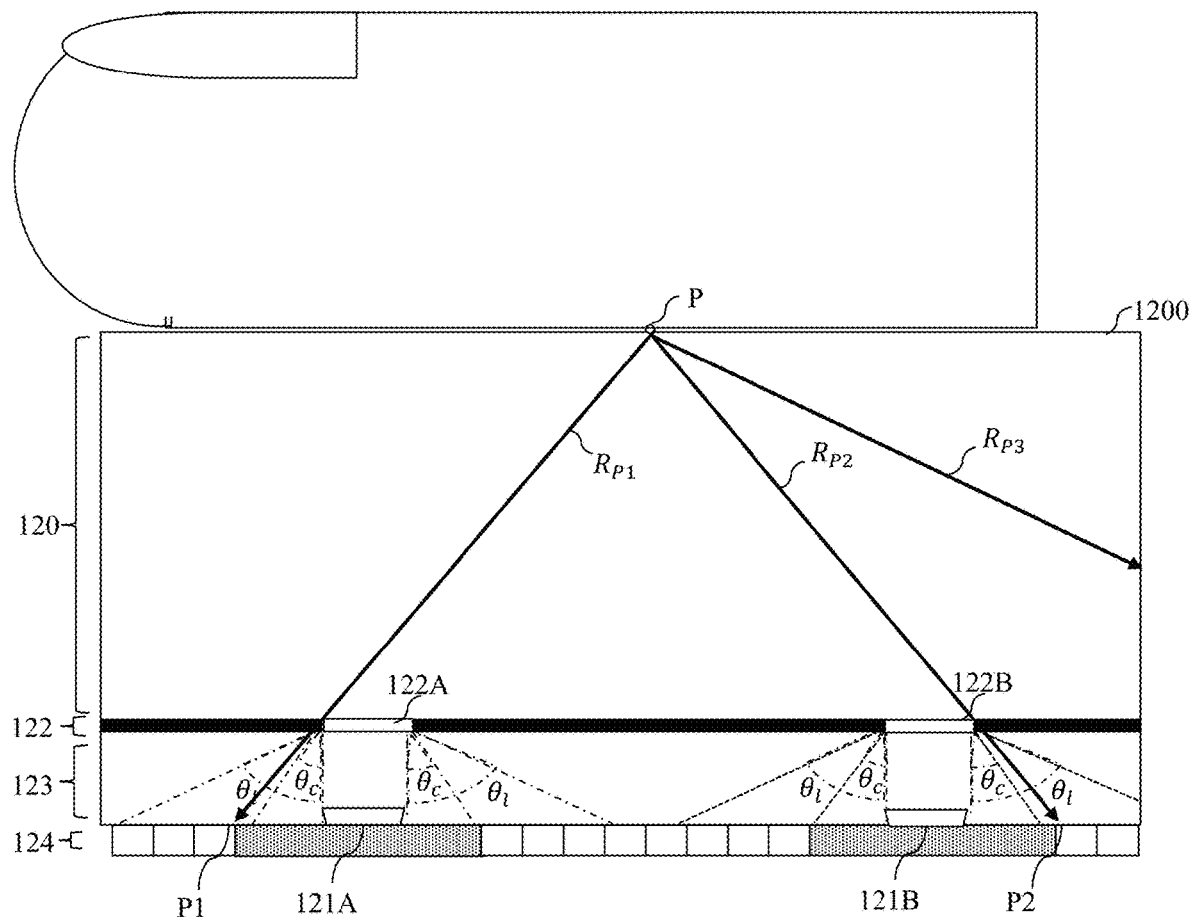
FIG. 4A schematically illustrates a second embodiment of the device for capturing an imprint of a body part according to the invention.

FIG. 4A schematically illustrates a second embodiment of the biometric device 12 according to the invention.

In this embodiment, we retrieve the plate 120, the opaque screen 122, the plate 123 and the sensor 124.

In this embodiment, the light source is no longer situated at the level of the opaque screen 122. LEDs are inserted at the level of the sensor 124, i.e. under the opaque screen 122. At least some of the holes of the opaque screen 122 have a facing LED.

In order for all of the finger D to diffuse light, in all the particular implementations relating to the embodiment of FIG. 4A, the holes of the opaque screen 122 having a LED facing are arranged such that each LED and the LED or LEDs which are the closest neighbours of said LED generate parts directly illuminated by the LEDs distant by a distance $\delta$ less than the distance $d_p$.

Moreover, in order to avoid the overlaps between the incidence zones, in all the particular implementations relating to the embodiment of FIG. 4A, the holes of the opaque screen 122 used to image the finger D are arranged such that the minimum distance L between a hole and the hole or holes which are its closest neighbours, taken centre to centre, is greater than the diameter of the image of the finger D projected onto the sensor 124 seen by a hole when the finger D is placed on the top face 1200, that is to say $L > d_{AP}$.

Each LED can be produced by deposition on the sensor 124. In this case each LED is incorporated on the surface of the sensor 124.

In a particular implementation, each LED is incorporated in the sensor 124.

In a particular implementation, each LED generates a light beam directed towards the holes having a maximum incidence angle $\theta_{max}$ relative to a normal to the top face 1200 that allows to avoid, after reflection on the opaque screen 122, having these LEDs illuminate light-sensitive photoreceptors. In a particular implementation, $\theta_{max}=23$ degrees.

Figure 4B:
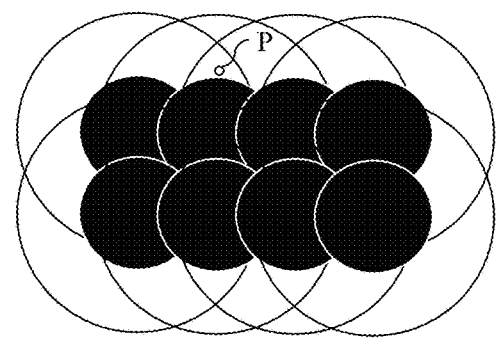
FIG. 4B schematically illustrates an operation of the second embodiment of the device for capturing an imprint of a body part according to the invention.
Figure 4C:
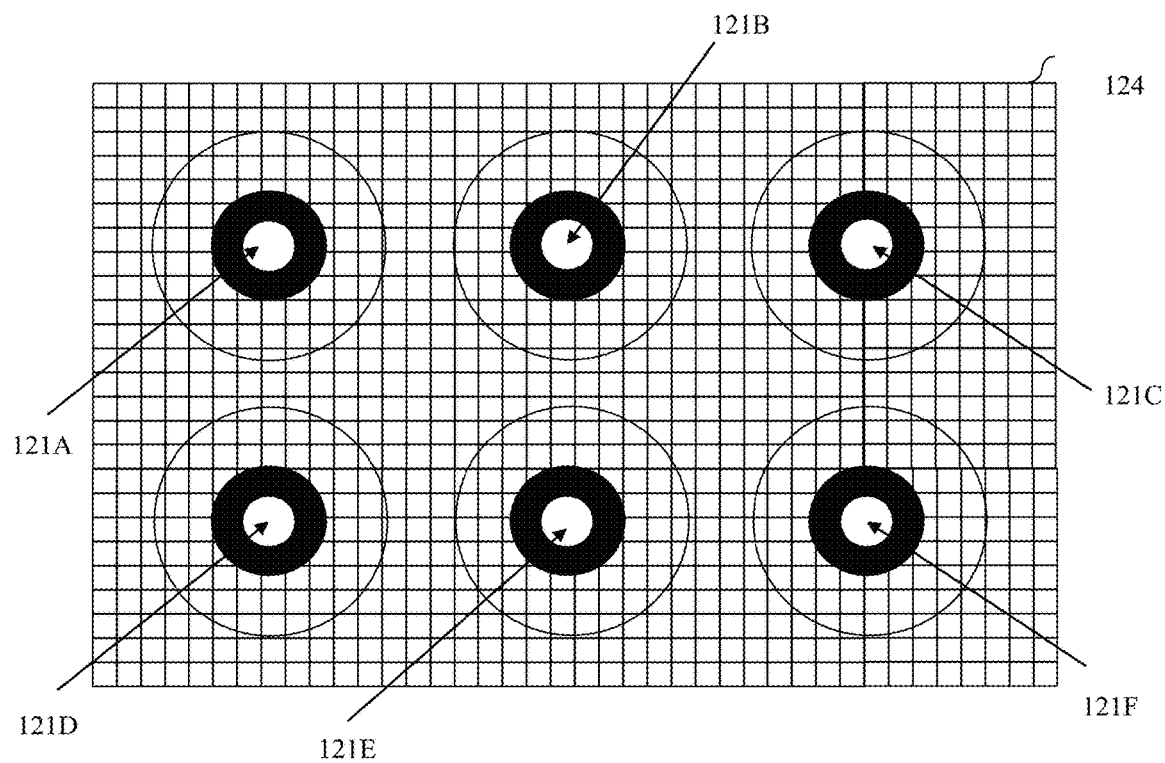
FIG. 4C schematically illustrates a subpart seen from the front of a first example of sensor adapted for the second embodiment of the device for capturing an imprint of a body part according to the invention.

FIG. 4C schematically illustrates a subpart seen from the front of a first example of sensor 124 suited to the second embodiment of the biometric device 12.

In the case of FIG. 4C, the holes of the opaque screen 122 form a rectangular matrix of holes.

In FIG. 4C, LEDs are inserted at positions corresponding to the centre of each central disc. One retrieves the LEDs 121A and 121B represented in FIG. 4A, and LEDs 121C, 121D, 121E and 121F. There is therefore a LED at each position of the sensor 124 receiving light rays that have passed through the opaque screen 122 through a hole and that have an angle incident with the normal to the top face 1200 less than the critical angle $\theta_c$. In this particular implementation, there is therefore a LED positioned at the level of the sensor 124 facing each hole of the opaque screen 122. Therefore, in the same way as the holes form a matrix of holes on the opaque screen 122, the LEDs form a matrix of LEDs on the sensor 124. As in the first embodiment of the biometric device 12, the photoreceptors situated in a central disc are not sensitive to light.

With circular holes, each LED illuminates a disc facing it on the finger D when the latter is placed on the top face 1200. When, for example, the transparent plate 120 and the transparent plate 123 respectively have a thickness of $E_{123}=60$ μm et $E_{120}=300$ μm, the holes have a diameter of "7" μm, and each LED is circular with a diameter of "10" μm, each LED illuminates a disc of approximately "92" μm. With an opaque screen comprising holes evenly distributed with a distance of "400" μm between the centres of the holes, all the surface of the finger D placed on the top face 1200 is not illuminated by the LEDs. However, as has been seen above, since a finger is a diffusing medium, all of the surface of the finger facing the top face 1200 will return light.

In this configuration, if an incidence zone is projected onto the top face 1200 through the hole of the opaque screen 122 corresponding to said incidence zone, a projection of the central disc of a diameter approximately equal to "544" μm and a projection of the peripheral ring of an outer diameter approximately equal to "1656" μm are obtained. With holes evenly distributed with a distance of "400" μm between the centres of the holes, the projections of the peripheral rings overlap.

FIG. 4B schematically illustrates a functioning of the second embodiment of the biometric device 12.

FIG. 4B reprises the device of FIG. 4C.

In FIG. 4B, the projections of 8 incidence zones on the top face 1200 have been represented. A point P, also represented in FIG. 4A, appears in the projection of three different peripheral rings. This point P is therefore imaged three times on the sensor 124: a first time at a point P1 by following a ray $R_{P1}$, a second time at a point P2 by following a ray $R_{P2}$ and a third time at a point not represented by following a ray $R_{P3}$. Imaging each point of the finger D several times allows to obtain a better image quality.

In the second embodiment of the biometric device 12, it is difficult to prevent a LED from disturbing the photoreceptors in its vicinity. To limit these disturbances, in a particular implementation, one LED out of two for each row and one LED out of two for each column of the matrix of LEDs are switched on to allow the capture of a first intermediate image and, conversely, only the LEDs not switched on for the first intermediate image are switched on to capture a second intermediate image. Each photoreceptor situated in a predefined vicinity of a LED that is switched on is not used to form an intermediate image. Each photoreceptor used to form an image is therefore situated outside of a predefined vicinity of each LED that is switched on. For example, in this particular implementation, only the photoreceptors situated in the peripheral rings corresponding to LEDs that are switched off are used to form the first and second intermediate images. The first and second intermediate images are then combined by the processing module 11 to form the image of the fingerprint D. In this way, the number of photoreceptors which are close to a LED that is switched on is reduced.

More generally, in another particular implementation, the LEDs are grouped together in a plurality of sets of LEDs. The sets of LEDs are switched on in succession and an intermediate image is acquired each time a set of LEDs is switched on. When a set of LEDs is switched on, the other sets of LEDs are switched off. Only the photoreceptors situated in the peripheral rings corresponding to LEDs that are switched off are used to form the intermediate images. The intermediate images obtained are then combined by the processing module 11 to form the image of the fingerprint D.

In a particular implementation, at least one set of LEDs is switched on to form an intermediate image. The intermediate images obtained are then combined by the processing module 11 to form the image of the fingerprint D.

In another particular implementation that allows to limit the disturbances, only one hole out of two per row of the matrix of holes and one hole out of two per column of the matrix of holes of the opaque screen 122 are associated with a LED. In this particular implementation, only one image is generated. Only the photoreceptors situated in the peripheral rings not including LEDs are used to form said image. In a variant of this particular implementation, the holes can be specialized. Thus, the holes used to bring the light towards the finger D can be larger than the holes used to image the finger D on the sensor 124. In a particular implementation, the holes used to image have a diameter of "7" μm whereas the holes used to bring the light towards the finger D have a diameter of "50" μm, the LED being able to be adapted to the size of the hole and have the same diameter.

More generally, in another particular implementation, at least one hole of the opaque screen is associated with a LED.

In another implementation that allows to limit the disturbances, the LEDs are not situated at the centre of each central disc but outside of the peripheral rings.

Figure 4D:
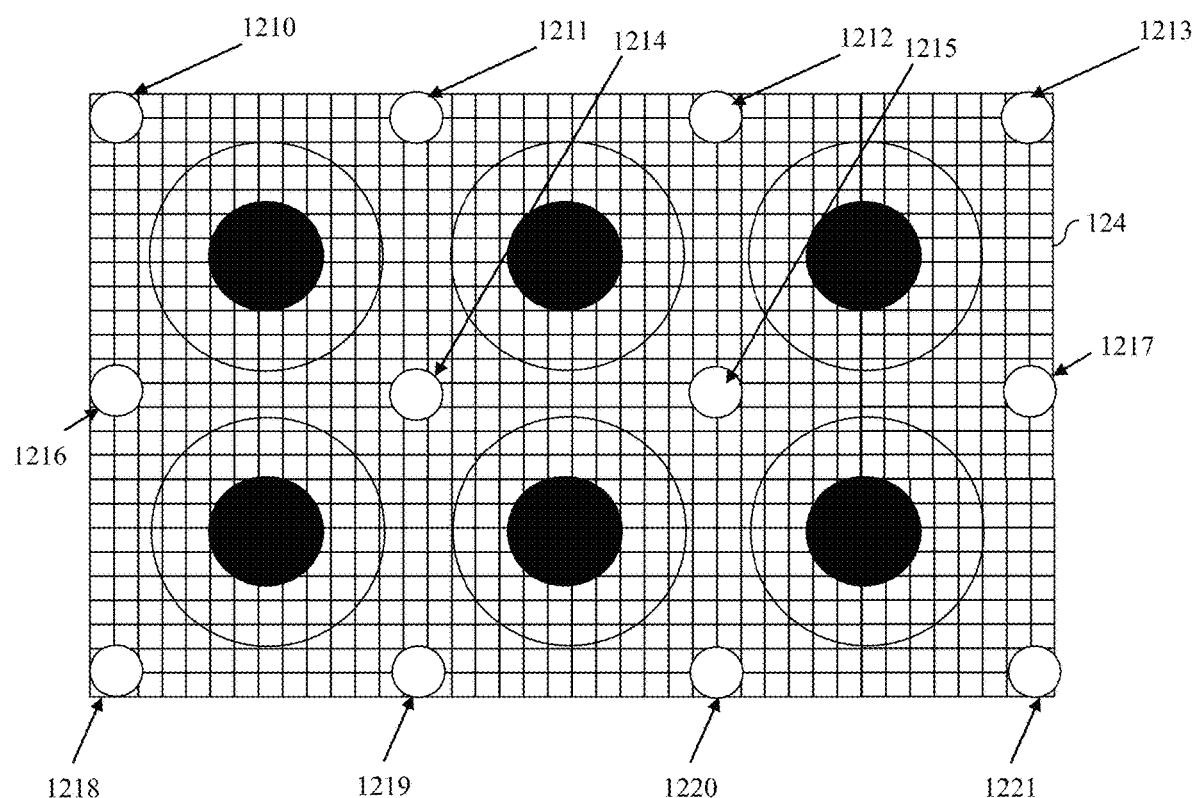
FIG. 4D schematically illustrates a subpart seen from the front of a second example of sensor adapted for the second embodiment of the device for capturing an imprint of a body part according to the invention.

FIG. 4D schematically illustrates a subpart seen from the front of a second example of sensor 124 adapted to the second embodiment of the biometric device 12 in which the LEDs are positioned outside of the peripheral rings.

In the example of FIG. 4D, the holes of the opaque screen 122 associated with a LED form a first rectangular matrix and the holes of the opaque screen not associated with a LED form a second rectangular matrix of holes interleaved in the first rectangular matrix of holes. Each hole associated with a LED is positioned at an equal distance from the centre of the closest four holes in its vicinity. On the sensor 124, each LED (1210 to 1221) is therefore positioned at an equal distance from the centre of the closest four peripheral rings in its vicinity. In this particular implementation, each LED therefore faces a hole in the opaque screen 122 that allows to bring the light towards the finger D and each incidence zone faces a hole in the opaque screen that allows to image the finger on the sensor 124. As in the preceding particular implementation, the holes used to image and the holes used to bring the light towards the finger D can have a different diameter. In this particular implementation, to avoid any disturbance of the photoreceptors situated in the vicinity of the LEDs, the photoreceptors situated outside of a peripheral ring are rendered insensitive to the light.

Moreover, as in the preceding particular implementation described in relation to FIG. 4B, to limit the disturbances of the photoreceptors by the LEDs that are too close, the LEDs can be grouped together in a plurality of sets of LEDs switched on in succession to generate intermediate images which are then combined to form a imprint image.

Figure 4E:
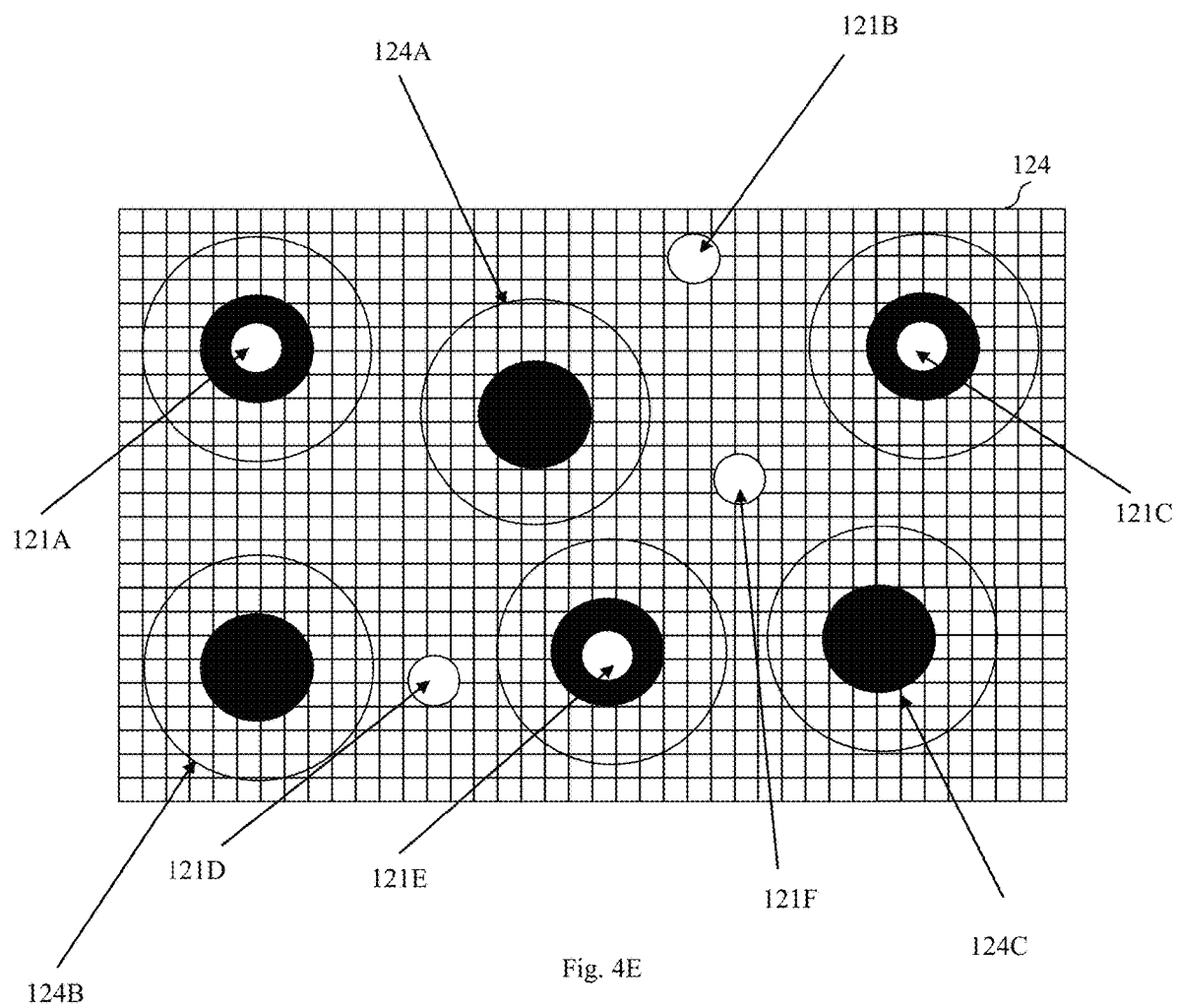
FIG. 4E schematically illustrates a subpart seen from the front of a third example of sensor adapted for the second embodiment of the device for capturing an imprint of a body part according to the invention.
Figure 5:
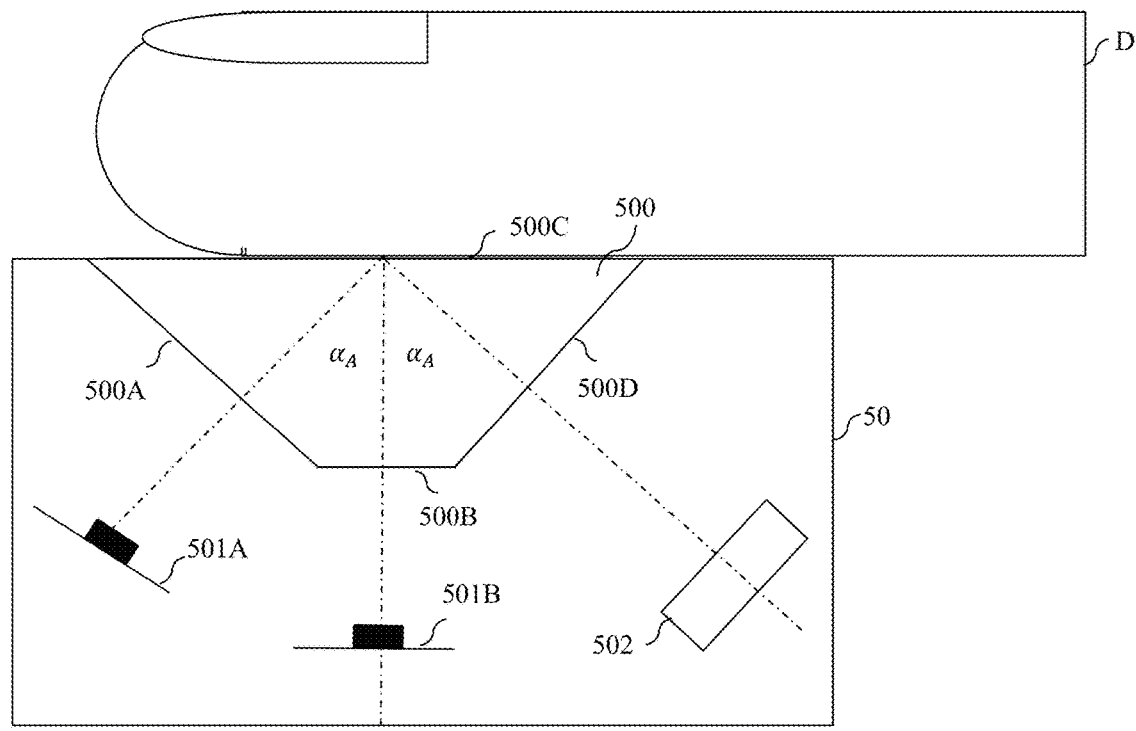
FIG. 5 schematically describes a device for capturing a fingerprint of the prior art working by total reflection and being able to operate in bright field mode or in dark field mode.

FIG. 4E schematically illustrates a subpart seen from the front of a third example of sensors adapted to the second embodiment of the device for capturing an imprint of a body part according to the invention.

In the example, the holes of the opaque screen 122 are spaced apart from one another by a distance L>$d_{AP}$ and, provided that the constraint on the distance L is respected, placed anywhere on the opaque screen 122. Each LED is associated with a hole, that is to say that each LED faces a hole. Some holes are used exclusively to bring the lights from the LEDs to the finger placed on the face 1200: these are the holes associated with the LEDs 121B, 121D and 121F. Some holes are used to both bring the lights from the LEDs to the finger D placed on the face 1200 and to image the finger D on the sensor 124: these are the holes associated with the LEDs 121A, 121C and 121E. Some holes are used exclusively to image the finger D on the sensor 124: these are the holes associated with the incidence zones 124A, 124B and 124C.

Moreover, as in the preceding particular implementation described in relation to FIG. 4B, to limit the disturbances of the photoreceptors by LEDs that are too close, the LEDs can be grouped together in a plurality of sets of LEDs switched on in succession to generate intermediate images which are combined to form an imprint image.

Note that the first and second embodiments of the biometric device 12 have been presented separately but that some particular implementations of each embodiment can easily be adapted to the other embodiment. In particular, the opaque screen 122 of FIG. 4E could also be used in the context of the first embodiment.

Furthermore, when the biometric device 12 is incorporated in the screen 10, the top face 1200 is incorporated in the glass of the screen 10. It is then considered that the face 1200 is the subpart of the glass of the screen 10 which is facing the opaque screen 122, the plate 123 and the sensor 124.

In one embodiment, the processing module 11 implements a fraud detection method exploiting the features of the biometric device 12.

The outer diameter of the peripheral ring of each incidence zone depends only on the limit angle $\theta_l$ and on the thickness of the transparent plate 123. The limit angle $\theta_l$ depends on the refractive index of the skin of the finger D. As has been seen above, it is generally accepted that the refractive index of the skin, according to the wavelength of the light source, lies between "1.41" and "1.47". The limit angle $\theta_l$ then lies between a minimum value $\theta_l^{min}$, here equal to "70°", and a maximum value $\theta_l^{max}$, here equal to "76°", which allows to deduce a range of values within which the outer diameter of a peripheral ring must be included.

Figure 8:
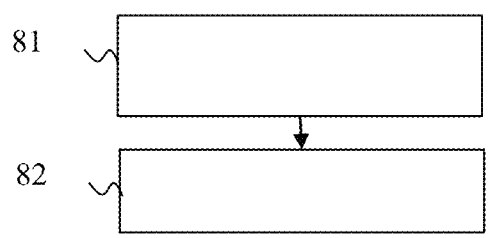
FIG. 8 schematically illustrates a fraud detection method using the device according to the invention.

FIG. 8 schematically illustrates a fraud detection method using the biometric device 12.

In a step 81, the processing module 11 determines whether the sensor 124 is struck by light rays having an incident angle relative to the normal to the top face 1200 greater than the maximum angle $\theta_l^{max}$ or whether, in at least one predetermined zone of the sensor 124, said sensor 124 is exclusively struck by light rays having an incidence angle relative to the normal to the top face 1200 less than the minimum angle $\theta_l^{min}$. To do this, in one embodiment, the processing module determines whether the real outer diameter of at least one peripheral ring is greater than a maximum diameter $d_{AP}^{max}$ such that:

$$d_{AP}^{max}=d_T+2\cdot|y|\cdot E_{120}\cdot\tan(\theta_l^{max})$$

or less than a minimum diameter $d_{AP}^{max}$ such that:

$$d_{AP}^{min}=d_T+2\cdot|y|\cdot E_{120}\cdot\tan(\theta_l^{min})$$

The processing module 11 can determine whether the real outer diameter of at least one peripheral ring is greater than the maximum diameter $d_{AP}^{max}$ by determining whether at least one photoreceptor situated outside of the peripheral rings of radii $d_{AP}^{max}$ generates an information item indicating that it is struck by a light ray.

The processing module 11 can determine whether the real outer diameter of at least one peripheral ring is less than the minimum diameter $d_{AP}^{min}$ by determining whether no photoreceptor situated outside of the peripheral rings of radii $d_{AP}^{min}$ generates an information item indicating that it is struck by a light ray.

In a step 82, the processing module 11 detects that there is fraud if the sensor 124 is struck by light rays having an incident angle relative to the normal to the top face 1200 greater than the maximum angle $\theta_I^{max}$ or exclusively less than the minimum angle $\theta_I^{min}$. The processing module 11 then deduces therefrom that the finger D facing the face 1200 comprises at least a part which is not covered with skin.

Figure 9:
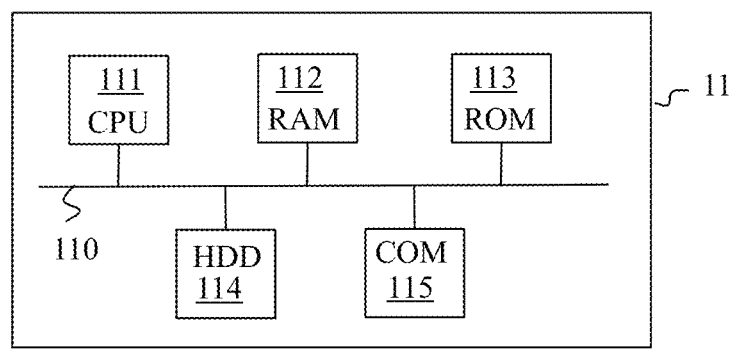
FIG. 9 schematically illustrates an example of hardware architecture of a processing module implementing the fraud detection method.

FIG. 9 schematically illustrates an example of hardware architecture of the processing module 11.

According to the example of hardware architecture represented in FIG. 9, the processing module 11 then comprises, linked by a communication bus 110: a processor or CPU (Central Processing Unit) 111; a Random Access Memory RAM 112; a Read-Only Memory ROM 113; a storage unit such as a hard disk or a storage medium reader, such as an SD (Secure Digital) card reader 114; at least one communication interface 115 allowing the processing module 11 to communicate with the biometric device 12.

The processor 111 is capable of executing instructions loaded into the RAM 112 from the ROM 113, from an external memory (not represented), from a storage medium (such as an SD card), or from a communication network. When the analysis module 11 is powered up, the processor 111 is capable of reading instructions from the RAM 112 and of executing them. These instructions form a computer program causing the implementation, by the processor 111, of the method described in relation to FIG. 8.

The method described in relation to FIG. 8 can be implemented in software form by execution of a set of instructions by a programmable machine, for example a DSP (Digital Signal Processor), a microcontroller or a GPU (Graphics Processing Unit), or be implemented in hardware form by a machine or a dedicated component, for example an FPGA (Field-Programmable Gate Array) or an ASIC (Application-Specific Integrated Circuit).

Note that the processing module 11 could equally have been included in the biometric device 12.

The invention claimed is:

1. A device for capturing an imprint of a body part comprising a plurality of optically coupled elements comprising:
   a first transparent plate comprising a top face on which the body part bearing the imprint to be imaged can rest;
   a light source;
   a screen opaque to light situated below the first transparent plate;
   a second transparent plate situated below the opaque screen;
   a sensor comprising light-sensitive photoreceptors situated below the second transparent plate supplying information allowing generation of an image of the imprint;
   the faces of the transparent plates, the opaque screen and the sensor being parallel, wherein:
   the light source generates light beams passing through at least the first transparent plate towards the top face having an incident angle relative to a normal to said top face of a value less than a critical angle dependent on the refractive indices of the first plate and of air and beyond which a light ray is totally reflected by said top face in the presence of air above said top face;
   the opaque screen comprises a network of holes such that each light ray directed towards the sensor which reaches the opaque screen at a hole passes through the opaque screen and reaches the sensor;
   all light-sensitive photoreceptors of the sensor are positioned outside of any position of the sensor that can be struck by a light ray from the body part having an incidence angle relative to said normal less than the critical angle; and
   each point of the body part in contact with the top face is imaged by at least one photoreceptor of said sensor.

2. The device according to claim 1, wherein at least some of the holes, called imaging holes, serve to image the body part, and in that a distance between an imaging hole and the imaging hole or holes which are its closest neighbours, taken from centre to centre, is greater than the diameter of an image of the body part seen by a hole when the body part is placed on the top face.

3. The device according to claim 1, wherein the light source is composed of at least one light-emitting diode, called LED, and when the light source comprises a plurality of LEDs, the LEDs are configured such that each LED producing light and the LED or LEDs producing light which are the closest neighbours of said LED generate, on the body part, parts illuminated directly by said LEDs that are distant by a distance less than a predefined distance characteristic of a depth of penetration of the light into the body part.

4. The device according to claim 3, wherein the light source is incorporated on a bottom face of the first plate or incorporated on a top face of the second plate and generates a light beam above the opaque screen.

5. The device according to claim 3, wherein the light source is incorporated on the surface of the sensor or incorporated in the sensor and generates a light beam below the opaque screen passing through the opaque screen via holes towards the top face and each LED of the light source is positioned facing a hole of the opaque screen, at least some of the holes being associated with a LED.

6. The device according to claim 5, wherein the LEDs are grouped in sets of LEDs, each set of LEDs being intended to be switched on independently of the other sets of LEDs, at least one of the sets of LEDs being switched on to acquire an intermediate image, each intermediate image acquired being used to form the image of the imprint.

7. The device according to claim 6, wherein each photoreceptor used to form an image is situated outside a predefined vicinity of each LED switched on.

8. The device according to claim 5, wherein the holes of the opaque screen form a rectangular matrix of holes, one hole out of two per row of the rectangular matrix of holes and one hole out of two per column of the rectangular matrix of holes are associated with a LED in which the holes of the opaque screen form a first and a second interleaved rectangular matrices of holes, the holes of the first rectangular matrix of holes are associated with a LED and the holes of the second rectangular matrix of holes are not associated with a LED, each hole associated with a LED of the first rectangular matrix of holes being positioned at an equal distance from the centre of the four holes of the second matrix of holes in its closest vicinity.

9. The device according to claim 8, wherein the holes which are associated with a LED have a diameter greater than the holes which are not associated with an LED.

10. The device according to claim 6, wherein the holes of the opaque screen form a rectangular matrix of holes, each hole being associated with a LED, the device is adapted for one LED out of two for each row and one LED out of two for each column of the matrix of LEDs to be switched on to allow a capture of a first intermediate image and only the LEDs not switched on for the first intermediate image are switched on to capture a second intermediate image, an imprint image being formed from the first and the second intermediate images.

11. The device according to claim 1, wherein when a point of the body part is imaged by several photoreceptors of the sensor, the information items from each sensor having imaged said point are mutually rebalanced by taking into account, for each photoreceptor, an information item representative of a distance between said photoreceptor and the point which has been imaged, a representation of this point in an imprint image is computed following the rebalancing in the form of an average of the information items from each photoreceptor having imaged this point or in the form of a weighted average of the information items from each photoreceptor having imaged this point or in the form of a median value of the information items from each photoreceptor having imaged this point or in the form of a minimum value of the information items from each photoreceptor having imaged this point.

12. The device according to claim 1, wherein each photoreceptor of the sensor corresponding to a position that can be struck by a light ray from the body part having an incidence angle relative to the normal to the top face less than the critical angle is masked by an opaque metallic layer.

13. The device according to claim 1, wherein the first plate has a thickness three to ten times greater than a thickness of the second plate.

14. The device according to claim 4 when the light source is incorporated on the bottom face of the first plate, wherein each light-emitting diode comprises, in a first layer, a first transparent electrode, in a second layer situated immediately below the first, a stack of layers forming an LED and in a third layer common to each LED of the light source, a metal layer forming a second electrode, each layer being produced by deposition and etching on the bottom face of the first plate, the screen being implemented by said metal layer and comprising holes.

15. A method for detecting fraud in a use of a device for capturing an imprint of a body part according to claim 1, wherein the method comprises:
   determining if the sensor is struck by light rays having an incident angle relative to the normal to the top face greater than a maximum value that can be taken by a limit angle dependent on the refractive indices of the first plate and of the body part and beyond which a light ray is totally reflected by said top face when said light ray strikes the top face at a point of contact between the top face and a finger or, if, in at least one predetermined zone of the sensor, the sensor is struck exclusively by light rays having an incident angle relative to the normal to the top face less than a minimum value that can be taken by the limit angle; and, detecting that there is a fraud if the sensor is struck by light rays having an incident angle relative to the normal to the top face greater than said maximum value or, if in at least one predetermined zone of the sensor, the sensor is struck exclusively by light rays having an incident angle relative to the normal to the top face less than said minimum value.

16. An apparatus comprising a device for capturing an imprint of a body part comprising a plurality of optically coupled elements comprising:
   a first transparent plate comprising a top face on which the body part bearing the imprint to be imaged can rest;
   a light source;
   a screen opaque to light situated below the first transparent plate;
   a second transparent plate situated below the opaque screen;
   a sensor comprising light-sensitive photoreceptors situated below the second transparent plate supplying information allowing generation of an image of the imprint;
   the faces of the transparent plates, the opaque screen and the sensor being parallel, wherein:
   the light source generates light beams passing through at least the first transparent plate towards the top face having an incident angle relative to a normal to said top face of a value less than a critical angle dependent on the refractive indices of the first plate and of air and beyond which a light ray is totally reflected by said top face in the presence of air above said top face;
   the opaque screen comprises a network of holes such that each light ray directed towards the sensor which reaches the opaque screen at a hole passes through the opaque screen and reaches the sensor;
   all light-sensitive photoreceptors of the sensor are positioned outside of any position of the sensor that can be struck by a light ray from the body part having an incidence angle relative to said normal less than the critical angle; and
   each point of the body part in contact with the top face is imaged by at least one photoreceptor of said sensor.

* * * * *